United States Patent
Kim et al.

(10) Patent No.: US 11,092,842 B2
(45) Date of Patent: Aug. 17, 2021

(54) DISPLAY PANEL AND METHOD OF MANUFACTURING WAVELENGTH CONVERSION SUBSTRATE

(71) Applicant: SAMSUNG DISPLAY CO., LTD., Yongin-si (KR)

(72) Inventors: Jang-Il Kim, Asan-si (KR); Jeongki Kim, Hwaseong-si (KR); Jong-Hoon Kim, Seoul (KR); Jeaheon Ahn, Hwaseong-si (KR); Myoungjong Lee, Cheonan-si (KR); Seok-Joon Hong, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/845,690

(22) Filed: Apr. 10, 2020

(65) Prior Publication Data
US 2020/0326586 A1  Oct. 15, 2020

(30) Foreign Application Priority Data
Apr. 11, 2019  (KR) ........................ 10-2019-0042582

(51) Int. Cl.
*G02F 1/1335* (2006.01)
*G02F 1/1347* (2006.01)

(52) U.S. Cl.
CPC .... *G02F 1/133516* (2013.01); *G02F 1/13473* (2013.01); *G02F 1/133512* (2013.01)

(58) Field of Classification Search
None
See application file for complete search history.

(56) References Cited

U.S. PATENT DOCUMENTS

| | | | |
|---|---|---|---|
| 9,989,806 | B2 | 6/2018 | Lee et al. |
| 2017/0062528 | A1 | 3/2017 | Aoyama et al. |
| 2017/0090247 | A1 | 3/2017 | Lee et al. |
| 2018/0275461 | A1 | 9/2018 | Park et al. |

FOREIGN PATENT DOCUMENTS

| | | |
|---|---|---|
| JP | 2017227858 A | 12/2017 |
| KR | 20150125207 A | 11/2015 |
| KR | 20170031613 A | 3/2017 |
| KR | 20170039064 A | 4/2017 |
| KR | 20180107443 A | 10/2018 |

*Primary Examiner* — Vip Patel
(74) *Attorney, Agent, or Firm* — Cantor Colburn LLP

(57) ABSTRACT

A display panel includes a first substrate in which first, second and third pixel areas and a light blocking area are defined, and a second substrate. The first substrate includes a base layer, a first wavelength conversion layer disposed under the base layer, a second wavelength conversion layer disposed under the base layer, an optical layer disposed under the base layer, a first partition layer disposed between the first and second wavelength conversion layers and including a first layer including a same material as that of the optical layer and a second layer spaced apart from the base layer with the first layer interposed therebetween, and a second partition layer disposed between the second wavelength conversion layer and the optical layer.

20 Claims, 10 Drawing Sheets

DISPLAY PANEL AND METHOD OF MANUFACTURING WAVELENGTH CONVERSION SUBSTRATE

This application claims priority to Korean Patent Application No. 10-2019-0042582, filed on Apr. 11, 2019, and all the benefits accruing therefrom under 35 U.S.C. § 119, the content of which in its entirety is herein incorporated by reference.

BACKGROUND

1. Field

Exemplary embodiments of the invention herein relate to a display panel with improved display quality and a method of manufacturing a wavelength conversion substrate included therein.

2. Description of Related Art

A display panel may include a wavelength conversion member to express color. The wavelength conversion member may include pigment particles having a predetermined color or an illuminant for emitting a predetermined color. When light provided from a pixel area is incident to a wavelength conversion part corresponding thereto, another wavelength conversion part adjacent to the corresponding wavelength conversion part may also emit light to cause a combination of colors.

SUMMARY

Exemplary embodiments of the invention may provide a display panel with improved display quality and a method of manufacturing a wavelength conversion substrate included therein.

In an exemplary embodiment of the invention, a display panel may include a first substrate in which a first pixel area, a second pixel area, a third pixel area and a light blocking area are defined, and a second substrate including a first element, a second element and a third element which correspond to the first pixel area, the second pixel area and the third pixel area, respectively. The first substrate may include a base layer, a first wavelength conversion layer disposed under the base layer and disposed in the first pixel area, a second wavelength conversion layer disposed under the base layer and disposed in the second pixel area, an optical layer disposed under the base layer and disposed in the third pixel area, a first partition layer disposed between the first and second wavelength conversion layers and including a first layer including a same material as a material of the optical layer and a second layer spaced apart from the base layer with the first layer interposed therebetween, and a second partition layer disposed between the second wavelength conversion layer and the optical layer.

In an exemplary embodiment, the second layer may include a same material as a material of the second partition layer.

In an exemplary embodiment, a thickness of the second layer may be less than a thickness of the second partition layer.

In an exemplary embodiment, the second layer and the second partition layer may include a material which is capable of absorbing blue light and of which a light transmittance is not 0 (zero).

In an exemplary embodiment, the second layer and the second partition layer may include a red color filter, a green color filter, or a yellow color filter.

In an exemplary embodiment, the first substrate may further include a red color filter layer disposed between the first wavelength conversion layer and the base layer, a green color filter layer disposed between the second wavelength conversion layer and the base layer, and a blue color filter layer disposed between the optical layer and the base layer.

In an exemplary embodiment, the first substrate may further include a first protective layer covering the red color filter layer, the green color filter layer, and the blue color filter layer. The first protective layer may be disposed between the red color filter layer and the first wavelength conversion layer, between the green color filter layer and the second wavelength conversion layer, and between the blue color filter layer and the optical layer.

In an exemplary embodiment, the first substrate may further include a second protective layer covering the first and second wavelength conversion layers. A portion of the second protective layer may be disposed between the optical layer and the blue color filter layer.

In an exemplary embodiment, each of the first layer and the optical layer may include a base resin and scattering particles dispersed in the base resin.

In an exemplary embodiment, each of the first layer and the optical layer may further include blue particles dispersed in the base resin.

In an exemplary embodiment of the invention, a display panel may include a first substrate in which a first pixel area, a second pixel area, a third pixel area and a light blocking area are defined, and a second substrate including a first element, a second element and a third element which correspond to the first pixel area, the second pixel area and the third pixel area, respectively. The first substrate may include a base layer, a first wavelength conversion layer disposed under the base layer and disposed in the first pixel area, a second wavelength conversion layer disposed under the base layer and disposed in the second pixel area, a protective layer covering the first wavelength conversion layer and the second wavelength conversion layer, an optical layer disposed under the protective layer and disposed in the third pixel area, a first partition layer disposed between the first wavelength conversion layer and the second wavelength conversion layer, and a second partition layer disposed between the second wavelength conversion layer and the optical layer.

In an exemplary embodiment, each of the first and second partition layers may be capable of absorbing blue light and may have a light transmittance which is not 0.

In an exemplary embodiment, the first partition layer may include a first layer disposed under the base layer, and a second layer disposed under the first layer.

In an exemplary embodiment, the first layer may include a same material as a material of the optical layer, and the second layer may include a same material as a material of the second partition layer.

In an exemplary embodiment, each of the first layer and the optical layer may include a base resin and scattering particles dispersed in the base resin.

In an exemplary embodiment, each of the first layer and the optical layer may further include blue particles dispersed in the base resin.

In an exemplary embodiment, a thickness of the second layer may be less than a thickness of the second partition layer.

In an exemplary embodiment of the invention, a method of manufacturing a wavelength conversion substrate may include forming a first color filter layer, a second color filter layer, and a third color filter layer on a base layer, forming a first wavelength conversion layer overlapping with the first color filter layer, forming a second wavelength conversion layer overlapping with the second color filter layer, forming a protective layer covering the first wavelength conversion layer and the second wavelength conversion layer, forming an optical layer overlapping with the third color filter layer on the protective layer, forming a first layer including a same material as that of the optical layer between the first wavelength conversion layer and the second wavelength conversion layer, forming a second layer on the first layer, and forming a partition layer between the second wavelength conversion layer and the optical layer.

In an exemplary embodiment, the first layer and the optical layer may be provided at a same time.

In an exemplary embodiment, the second layer and the partition layer may be provided at a same time.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
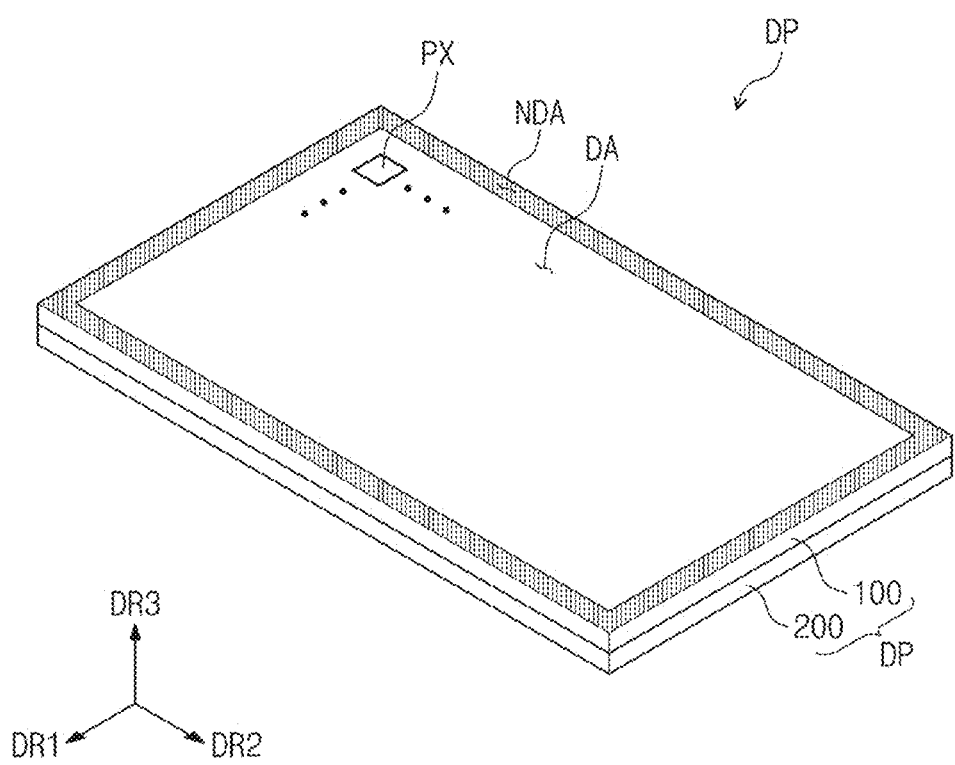
FIG. 1 is a perspective view illustrating an exemplary embodiment of a display panel according to the invention.

The invention now will be described more fully hereinafter with reference to the accompanying drawings, in which various exemplary embodiments are shown. The invention may, however, be embodied in many different forms, and should not be construed as limited to the exemplary embodiments set forth herein. Rather, these exemplary embodiments are provided so that this invention will be thorough and complete, and will fully convey the scopes of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. For example, if the device in the drawing figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the drawing figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

FIG. 1 is a perspective view illustrating an exemplary embodiment of a display panel according to the invention.

Referring to FIG. 1, a display area DA and a non-display area NDA may be defined in a display panel DP.

An image may be displayed in the display area DA. An image may not be displayed in the non-display area NDA. Pixels PX may be disposed in the display area DA but may not be disposed in the non-display area NDA. The pixels PX may mean effective pixels for providing an image.

The display area DA may be parallel to a plane defined by a first direction DR1 and a second direction DR2. A normal direction of the display area DA (i.e., a thickness direction of the display panel DP) may be indicated by a third direction DR3. A front surface (or a top surface) and a rear surface (or a bottom surface) of each of members may be defined by the third direction DR3. In the specification, it may be understood that when one or more components are viewed in a plan view, it or they may be viewed in a direction opposite to the third direction DR3.

The display panel DP may be used in large-sized electronic devices (e.g., televisions, monitors, and external billboards) and small and middle-sized electronic devices (e.g., personal computers, notebook computers, personal digital assistants ("PDAs"), car navigation units, game consoles, portable electronic devices, and cameras). However, these are provided only as examples of the invention, and the display panel DP according to the invention may also be applied to other electronic devices without departing the spirits and scopes of the invention.

A bezel area of the display panel DP may be defined by the non-display area NDA. The non-display area NDA may be adjacent to the display area DA. The non-display area NDA may surround the display area DA in a plan view. However, the invention is not limited thereto. The shapes of the display area DA and the non-display area NDA may be variously designed. In another exemplary embodiment, the non-display area NDA may be omitted.

The display panel DP may include a first substrate 100 and a second substrate 200. The first substrate 100 may include pixel areas and a light blocking area, and the second substrate 200 may include elements. These will be described hereinafter in detail.

Figure 2:
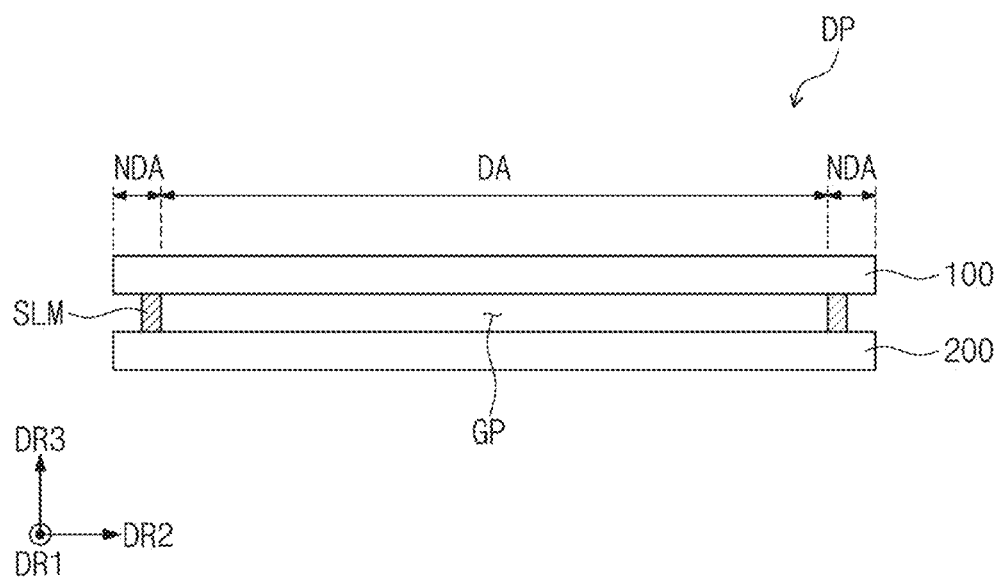
FIG. 2 is a cross-sectional view illustrating an exemplary embodiment of a display panel according to the invention.

FIG. 2 is a cross-sectional view illustrating an exemplary embodiment of a display panel according to the invention.

Referring to FIG. 2, the display panel DP may include the first substrate 100 and the second substrate 200. The first substrate 100 and the second substrate 200 may face each other and may be spaced apart from each other. Thus, a cell gap GP may be provided between the first substrate 100 and the second substrate 200.

The cell gap GP may be maintained by a sealant SLM coupling the first substrate 100 and the second substrate 200. The sealant SLM may include an organic adhesive member or an inorganic adhesive member. The sealant SLM may include a frit.

Figure 3:
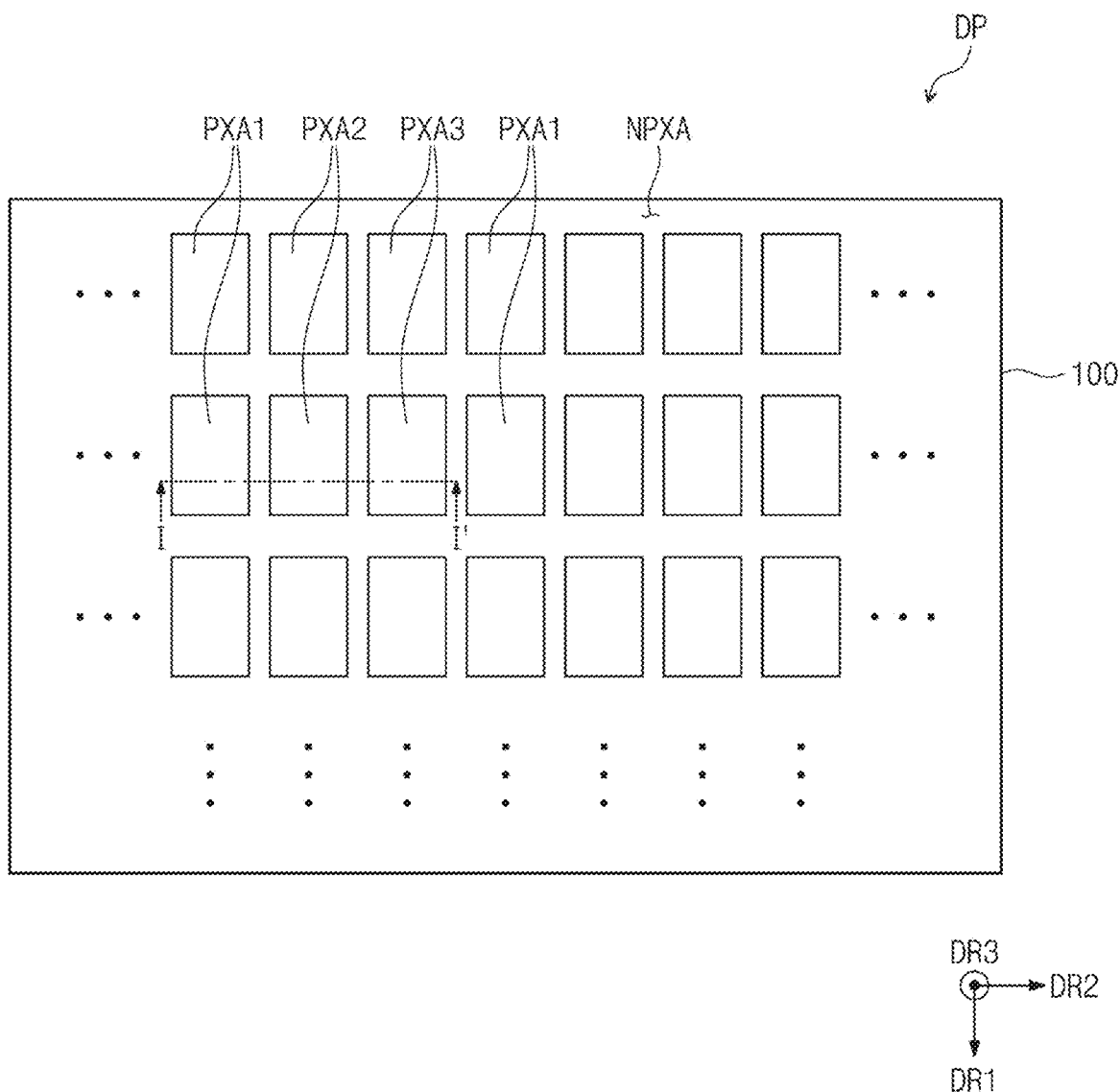
FIG. 3 is a plan view illustrating an exemplary embodiment of a display panel according to the invention.

FIG. 3 is a plan view illustrating an exemplary embodiment of a display panel according to the invention. FIG. 3 may be a plan view of the display panel DP from a top view.

Referring to FIG. 3, first pixel areas PXA1, second pixel areas PXA2, third pixel areas PXA3 and a light blocking area NPXA may be defined in the first substrate 100 of the display panel DP. The display panel DP may provide first color light through the first pixel areas PXA1, may provide second color light through the second pixel areas PXA2, and may provide third color light through the third pixel areas PXA3. The first color light, the second color light and the third color light may have different colors from each other. In an exemplary embodiment, one of the first to third color lights may be blue light, another thereof may be red light, and the other thereof may be green light, for example.

The first pixel areas PXA1 may be arranged in the first direction DR1, the second pixel areas PXA2 may be arranged in the first direction DR1, and the third pixel areas PXA3 may be arranged in the first direction DR1. The first pixel areas PXA1, the second pixel areas PXA2 and the third pixel areas PXA3 may be alternately arranged in the second direction DR2. In an exemplary embodiment, one first pixel area PXA1, one second pixel area PXA2 and one third pixel area PXA3 may be sequentially arranged in the second direction DR2, for example. However, the arrangement of the first to third pixel areas PXA1, PXA2 and PXA3 is not limited to that illustrated in FIG. 3.

The light blocking area NPXA may be disposed adjacent to the first pixel areas PXA1, the second pixel areas PXA2, and the third pixel areas PXA3. The light blocking area NPXA may set or define a boundary of the first pixel areas PXA1, the second pixel areas PXA2 and the third pixel areas PXA3. The light blocking area NPXA may prevent color mixing between the first pixel areas PXA1, the second pixel areas PXA2 and the third pixel areas PXA3. In addition, the light blocking area NPXA may block source light such that the source light is not provided to a user.

Figure 4:
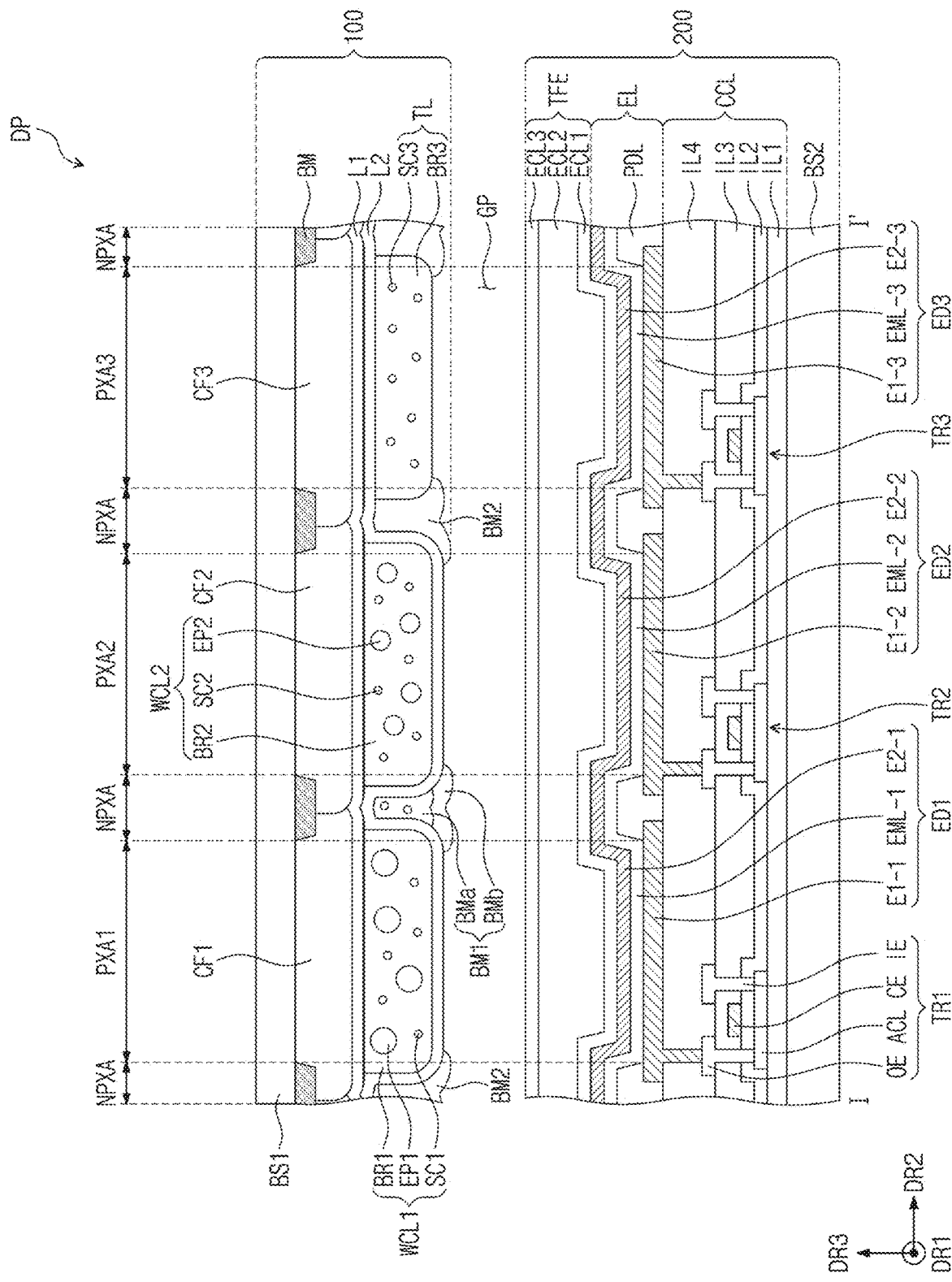
FIG. 4 is a cross-sectional view taken along line I-I' of FIG. 3.

FIG. 4 is a cross-sectional view taken along line I-I' of FIG. 3.

Referring to FIG. 4, the display panel DP may be an organic light emitting display panel or a quantum-dot light emitting display panel, for example. An emission layer of the organic light emitting display panel may include an organic light emitting material. An emission layer of the quantum-dot light emitting display panel may include quantum dots and/or quantum rods. Hereinafter, the display panel DP which is the organic light emitting display panel will be described as an example.

The display panel DP may include the first substrate 100 and the second substrate 200. The first substrate 100 may be a wavelength conversion substrate, and the second substrate 200 may be a display substrate. In an exemplary embodiment, the first substrate 100 may include a wavelength conversion material and/or a material capable of blocking light of a specific wavelength band, for example. The second substrate 200 may provide light or may control a transmittance of light.

The first substrate 100 and the second substrate 200 may face each other. The first substrate 100 and the second substrate 200 may be spaced apart from each other with the cell gap GP interposed therebetween.

The first substrate 100 may include a base layer BS1, first to third color filter layers CF1, CF2 and CF3, a light blocking layer BM, an optical layer TL, first and second wavelength conversion layers WCL1 and WCL2, first and second protective layers L1 and L2, and first and second partition layers BM1 and BM2. In addition, the first to third pixel areas PXA1, PXA2 and PXA3 and the light blocking area NPXA may be defined in the first substrate 100. These were described above with reference to FIG. 3.

The base layer BS1 may be a plastic substrate, a glass substrate, an insulating film, or a stack structure including a plurality of insulating layers.

The light blocking layer BM may be disposed on one surface of the base layer BS1. The light blocking layer BM may be disposed in the light blocking area NPXA. The light blocking layer BM may define the light blocking area NPXA. The light blocking layer BM may not overlap with the first pixel areas PXA1, the second pixel areas PXA2 and the third pixel areas PXA3. In other words, a plurality of openings may be defined in the light blocking layer BM, and the plurality of openings may overlap with the first pixel areas PXA1, the second pixel areas PXA2, and the third pixel areas PXA3 in a plan view.

The first color filter layer CF1 may be disposed on the one surface of the base layer BS1. In an exemplary embodiment, the first color filter layer CF1 may be disposed under the base layer BS1, for example. The first color filter layer CF1 may be disposed in each of the first pixel areas PXA1.

The second color filter layer CF2 may be disposed on the one surface of the base layer BS1. In an exemplary embodiment, the second color filter layer CF2 may be disposed under the base layer BS1, for example. The second color filter layer CF2 may be disposed in each of the second pixel areas PXA2.

The third color filter layer CF3 may be disposed on the one surface of the base layer BS1. In an exemplary embodiment, the third color filter layer CF3 may be disposed under the base layer BS1, for example. The third color filter layer CF3 may be disposed in each of the third pixel areas PXA3.

In an exemplary embodiment, the first color filter layer CF1 may be a red color filter layer, the second color filter layer CF2 may be a green color filter layer, and the third color filter layer CF3 may be a blue color filter layer, for example. However, the invention is not limited thereto, and the color filters may be various other color filters.

The first protective layer L1 may cover the first to third color filter layers CF1, CF2 and CF3 and the light blocking layer BM. In an exemplary embodiment, the first protective layer L1 may include silicon oxide, silicon nitride, or silicon oxynitride, for example. In another exemplary embodiment, the first protective layer L1 may be omitted.

The first wavelength conversion layer WCL1 and the second wavelength conversion layer WCL2 may be disposed under the first protective layer L1.

The first wavelength conversion layer WCL1 may be disposed in the first pixel area PXA1, and the second wavelength conversion layer WCL2 may be disposed in the second pixel area PXA2. The first wavelength conversion layer WCL1 may be disposed under the first color filter layer CF1, and the second wavelength conversion layer WCL2 may be disposed under the second color filter layer CF2.

The first wavelength conversion layer WCL1 may include a first base resin BR1, first scattering particles SC1, and first illuminants EP1, and the second wavelength conversion layer WCL2 may include a second base resin BR2, second scattering particles SC2, and second illuminants EP2.

The second protective layer L2 may cover the first wavelength conversion layer WCL1 and the second wavelength conversion layer WCL2. In an exemplary embodiment, the second protective layer L2 may include silicon oxide, silicon nitride, or silicon oxynitride, for example.

The optical layer TL may be disposed under the second protective layer L2. The optical layer TL may be disposed in the third pixel area PXA3 and may be disposed under the third color filter layer CF3. The optical layer TL may include a third base resin BR3 and third scattering particles SC3.

Each of the first to third base resins BR1, BR2 and BR3 may be a medium in which the illuminants and/or the scattering particles are dispersed. Each of the first to third base resins BR1, BR2 and BR3 may include at least one of various resin composites typically referred to as binders. However, the invention is not limited thereto. In the specification, a medium capable of dispersing illuminants and/or scattering particles may be used as the base resin regardless of its name, additional function and/or constituent material. In some exemplary embodiments, the base resin may be a polymer resin. In an exemplary embodiment, the base resin may be an acrylic-based resin, a urethane-based resin, a silicon-based resin, or an epoxy-based resin. The base resin may be a transparent resin, for example.

In an exemplary embodiment, the first to third scattering particles SC1, SC2 and SC3 may be TiO2 or silica-based nanoparticles, for example. The first to third scattering particles SC1, SC2 and SC3 may scatter light. Since the optical layer TL does not include the illuminant, the amount of the third scattering particles SC3 included in the optical layer TL may be equal to or greater than the amount of the first scattering particles SC1 included in the first wavelength conversion layer WCL1 and the amount of the second scattering particles SC2 included in the second wavelength conversion layer WCL2. In another exemplary embodiment, the first and second scattering particles SC1 and SC2 may be omitted.

Each of the first and second illuminants EP1 and EP2 may be a particle capable of converting a wavelength of light. In an exemplary embodiment, each of the first and second illuminants EP1 and EP2 may be a quantum dot, a quantum rod, or a phosphor, for example.

The quantum dot may be a material having a crystal structure having a size of several nanometers and may be composed of hundreds to thousands of atoms. The quantum dot may show a quantum confinement effect in which an energy band gap is increased by the small size. When light of a wavelength corresponding to energy greater than the energy band gap is incident to the quantum dot, the quantum dot may be excited by absorbing the light and then may transition to a ground state while emitting light of a specific wavelength. Energy of the emitted light may correspond to the energy band gap. Light emitting characteristics of the quantum dot by the quantum confinement effect may be adjusted by adjusting the size and/or the composition of the quantum dot.

The quantum dot (or a core of the quantum dot) may include a group II-VI compound, a group III-V compound, a group IV-VI compound, a group IV element, a group IV compound, or any combination thereof.

In an exemplary embodiment, the group II-VI compound may include a binary compound including at least one of CdSe, CdTe, CdS, ZnS, ZnSe, ZnTe, ZnO, HgS, HgSe, HgTe, MgSe, MgS, and any combination thereof; a ternary compound including at least one of AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and any combination thereof; and a quaternary compound including at least one of HgZnTeS, CdZnSeS, CdZnSeTe, CdZnSTe, CdHgSeS, CdHgSeTe, CdHgSTe, HgZnSeS, HgZnSeTe, HgZnSTe, and any combination thereof.

In an exemplary embodiment, the group I-III-IV compound may include a ternary compound including at least one of $AgInS_2$, $CuInS_2$, $AgGaS_2$, $CuGaS_2$, and any combination thereof; a quaternary compound including at least one of $AgInGaS_2$, $CuInGaS_2$, and any combination thereof.

In an exemplary embodiment, the group III-V compound may include a binary compound including at least one of GaN, GaP, GaAs, GaSb, AlN, AlP, AlAs, AlSb, InN, InP, InAs, InSb, and any combination thereof; a ternary compound including at least one of GaNP, GaNAs, GaNSb, GaPAs, GaPSb, AlNP, ANAs, AlNSb, AlPAs, AlPSb, InGaP, InAlP, InNP, InNAs, InNSb, InPAs, InPSb, and any combination thereof; and a quaternary compound including at least one of GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and any combination thereof.

In an exemplary embodiment, the group IV-VI compound may include a binary compound including at least one of SnS, SnSe, SnTe, PbS, PbSe, PbTe, and any combination thereof; a ternary compound including at least one of SnSeS, SnSeTe, SnSTe, PbSeS, PbSeTe, PbSTe, SnPbS, SnPbSe, SnPbTe, and any combination thereof; and a quaternary compound including at least one of SnPbSSe, SnPbSeTe, SnPbSTe, and any combination thereof. The group IV element may include at least one of Si, Ge, and a combination thereof. The group IV compound may be a binary compound including at least one of SiC, SiGe, and a combination thereof.

In these cases, the binary compound, the ternary compound, or the quaternary compound may exist in the quantum dot with a substantially uniform concentration. In an alternative exemplary embodiment, a concentration of the binary compound, the ternary compound or the quaternary compound in a portion of the quantum dot may be different from that of the binary compound, the ternary compound or the quaternary compound in another portion of the quantum dot. In some exemplary embodiments, the quantum dot may have a core/shell structure in which one quantum dot surrounds another quantum dot. An interface of the core and the shell may have a concentration gradient in which a concentration of an element existing in the shell becomes progressively less toward a center.

In exemplary embodiments, the quantum dot may have a core-shell structure which includes a core including the nano-crystal described above and a shell surrounding the core. The shell of the quantum dot may function as a protective layer for preventing chemical denaturation of the core to maintain semiconductor properties of the core and/or may function as a charging layer for allowing the quantum dot to have electrophoretic characteristics. The shell may be a single layer or a multi-layer. An interface of the core and the shell may have a concentration gradient in which a concentration of an element existing in the shell becomes progressively less toward a center. In an exemplary embodiment, the shell of the quantum dot may include a metal or non-metal oxide, a semiconductor compound, or a combination thereof, for example.

In an exemplary embodiment, the metal or non-metal oxide may include, but not limited to, a binary compound (e.g., $SiO_2$, $AlO_3$, $TiO_2$, ZnO, MnO, $Mn_2O_3$, $Mn_3O_4$, CuO, FeO, $Fe_2O_3$, $Fe_3O_4$, CoO, $Co_3O_4$, or NiO) or a ternary compound (e.g., $MgAl_2O_4$, $CoFe_2O_4$, $NiFe_2O_4$, or $CoMn_2O_4$), for example.

In an exemplary embodiment, the semiconductor compound may include, but not limited to, CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, and/or AlSb, for example.

The quantum dot may have a full width of half maximum ("FWHM") of an emission wavelength spectrum that is about 45 nanometers (nm) or less (in particular, about 40 nm or less, and in more particular, about 30 nm or less), and color purity and/or color reproduction may be improved in the range. In addition, light emitted through the quantum dot may be emitted in all directions, and thus a wide viewing angle may be improved or realized.

Furthermore, a shape of the quantum dot may be a general shape known in the art but is not limited to a specific shape. In an exemplary embodiment, the quantum dot may have various shapes such as a spherical shape, a pyramidal shape, a multi-arm shape, a cubic nanoparticle shape, a nanotube shape, a nanowire shape, a nanofiber shape, or a nano-plate particle shape.

A color of light emitted from the quantum dot may be controlled depending on a particle size of the quantum dot, and thus the quantum dot may have one of various emission colors such as a blue color, a red color, and a green color. In an exemplary embodiment of the invention, when the first illuminant EP1 and the second illuminant EP2 are the quantum dots, a particle size of the first illuminant EP1 may be different from a particle size of the second illuminant EP2. In an exemplary embodiment, the particle size of the first illuminant EP1 may be greater than the particle size of the second illuminant EP2, for example. In this case, a wavelength of light emitted from the first illuminant EP1 may be longer than a wavelength of light emitted from the second illuminant EP2.

The first wavelength conversion layer WCL1 may convert blue light into red light and may provide the red light to the first color filter layer CF1, and the second wavelength conversion layer WCL2 may convert blue light into green light and may provide the green light to the second color filter layer CF2. The optical layer TL may scatter blue light and may provide the scattered blue light to the third color filter layer CF3.

The first color filter layer CF1 may transmit light in a wavelength band of the red light and may absorb other light. The second color filter layer CF2 may transmit light in a wavelength band of the green light and may absorb other light. The third color filter layer CF3 may transmit light in a wavelength band of the blue light and may absorb other light.

The first partition layer BM1 may be disposed between the first wavelength conversion layer WCL1 and the second wavelength conversion layer WCL2. The second partition layer BM2 may be disposed between the optical layer TL and the second wavelength conversion layer WCL2. In addition, the second partition layer BM2 may also be disposed between the optical layer TL and the first wavelength conversion layer WCL1 adjacent to the optical layer TL. In other words, the second partition layer BM2 may be disposed in the light blocking area NPXA around the optical layer TL.

The first partition layer BM1 and the second partition layer BM2 may overlap with the light blocking area NPXA in a plan view. At least a portion of each of the first and second partition layers BM1 and BM2 may not overlap with the first to third pixel areas PXA1, PXA2 and PXA3.

In an exemplary embodiment of the invention, the first partition layer BM1 may include a first layer BMa and a second layer BMb. The second layer BMb may be spaced apart from the base layer BS1 with the first layer BMa interposed therebetween. The first partition layer BM1 may include two layers, and the second partition layer BM2 may include a single layer. Thus, a thickness of each of the layers of the first partition layer BM1 may be less than a thickness of the second partition layer BM2. In an exemplary embodiment, a thickness of the first layer BMa may be less than the thickness of the second partition layer BM2, and a thickness of the second layer BMb may be less than the thickness of the second partition layer BM2, for example.

In an exemplary embodiment of the invention, the first partition layer BM1 and the second partition layer BM2 may include a material capable of absorbing blue light. In addition, light transmittances of the first and second partition layers BM1 and BM2 may not be 0 (zero).

The first layer BMa may include the same material as that of the optical layer TL. In an exemplary embodiment, the first layer BMa may include the same materials as the third base resin BR3 and the third scattering particle SC3, for example. Since the optical layer TL is a light transmitting layer, a light transmittance of the first layer BMa may not be 0 (zero).

The second layer BMb may include the same material as that of the second partition layer BM2. The second layer BMb and the second partition layer BM2 may include a material capable of absorbing the blue light. In an exemplary embodiment, the second layer BMb and the second partition layer BM2 may include a red color filter, a green color filter, or a yellow color filter, for example. However, the invention is not limited thereto, and the second layer BMb and the second partition layer BM2 may include various other color filters.

According to exemplary embodiments of the invention, the second layer BMb and the second partition layer BM2 may absorb blue light, traveling in a direction causing color mixing, of lights provided from first to third emission layers EML-1, EML-2 and EML-3. Thus, a color mixing phenomenon between the first to third pixel areas PXA1, PXA2 and PXA3 may be reduced, and display quality of the display panel DP may be improved.

The second substrate 200 may include a base layer BS2, a circuit layer CCL, a light emitting element layer EL, and a thin film encapsulation layer TFE. The circuit layer CCL may be disposed on the base layer BS2. The circuit layer CCL may include a plurality of insulating layers, a plurality of conductive layers, and a semiconductor layer. The light emitting element layer EL may be disposed on the circuit layer CCL. The thin film encapsulation layer TFE may encapsulate the light emitting element layer EL. In another exemplary embodiment, the thin film encapsulation layer TFE may be omitted.

The base layer BS2 may be a plastic substrate, a glass substrate, an insulating film, or a stack structure including a plurality of insulating layers.

The circuit layer CCL may include first to third transistors TR1, TR2 and TR3 and a plurality of insulating layers IL1, IL2, IL3 and IL4. The plurality of insulating layers IL1, IL2, IL3 and IL4 may include a first insulating layer IL1, a second insulating layer IL2, a third insulating layer IL3, and a fourth insulating layer IL4.

The first insulating layer IL1 may be disposed on the base layer BS2, and the first to third transistors TR1, TR2 and TR3 may be disposed on the first insulating layer IL1. The first to third transistors TR1, TR2 and TR3 may have substantially the same structure. Thus, the structure of the first transistor TR1 will be described as an example. The first transistor TR1 may include a control electrode CE, an input electrode IE, an output electrode OE, and a semiconductor layer ACL.

The semiconductor layer ACL may be disposed on the first insulating layer IL1. The first insulating layer IL1 may be a buffer layer for providing a modified surface to the semiconductor layer ACL. In this case, the semiconductor layer ACL may have a higher adhesive strength to the first insulating layer IL1 than to the base layer BS2. In addition, the first insulating layer IL1 may be a barrier layer for protecting a bottom surface of the semiconductor layer ACL. In this case, the first insulating layer IL1 may inhibit or prevent a contaminant or moisture from permeating into the semiconductor layer ACL from the inside of the base layer BS2 or through the base layer BS2. In an exemplary embodiment, the first insulating layer IL1 may be a light blocking layer for preventing external light from being incident to the semiconductor layer ACL through the base layer BS2. In this case, the first insulating layer IL1 may further include a light blocking material.

The semiconductor layer ACL may include poly-silicon or amorphous silicon. In an alternative exemplary embodiment, the semiconductor layer ACL may include a metal oxide semiconductor. The semiconductor layer ACL may include a channel region functioning as a path through which electrons or holes move, and first and second ion-doped regions spaced apart from each other with the channel region interposed therebetween.

The second insulating layer IL2 may be disposed on the first insulating layer ILI and may cover the semiconductor layer ACL. The second insulating layer IL2 may include an inorganic material. In an exemplary embodiment, the inorganic material may include at least one of silicon nitride, silicon oxynitride, silicon oxide, titanium oxide, or aluminum oxide, for example.

The control electrode CE may be disposed on the second insulating layer IL2. The third insulating layer IL3 may be disposed on the second insulating layer IL2 and may cover the control electrode CE. The third insulating layer IL3 may be a single layer or may include a plurality of layers. In an exemplary embodiment, the single layer may include an inorganic layer, for example. The plurality of layers may include an organic layer and an inorganic layer.

The input electrode IE and the output electrode OE may be disposed on the third insulating layer IL3. The input electrode IE and the output electrode OE may be connected to the semiconductor layer ACL through through-holes penetrating the second and third insulating layers IL2 and IL3.

The fourth insulating layer IL4 may be disposed on the third insulating layer IL3 and may cover the input electrode IE and the output electrode OE. The fourth insulating layer IL4 may be a single layer or may include a plurality of layers. In an exemplary embodiment, the single layer may include an organic layer, for example. The plurality of layers may include an organic layer and an inorganic layer. The fourth insulating layer IL4 may be a planarization layer providing a flat top surface.

The light emitting element layer EL may be disposed on the fourth insulating layer IL4. The light emitting element layer EL may include a first element ED1, a second element ED2, a third element ED3, and a pixel defining layer PDL.

The first element ED1 may be disposed to correspond to the first pixel area PXA1. The first element ED1 may overlap with the first pixel area PXA1 in a plan view. The second element ED2 may be disposed to correspond to the second pixel area PXA2. The second element ED2 may overlap with the second pixel area PXA2 in a plan view. The third element ED3 may be disposed to correspond to the third pixel area PXA3. The third element ED3 may overlap with the third pixel area PXA3 in a plan view.

The first element ED1 may include a first electrode E1-1, a first emission layer EML-1, and a second electrode E2-1. The second element ED2 may include a first electrode E1-2, a second emission layer EML-2, and a second electrode E2-2. The third element ED3 may include a first electrode E1-3, a third emission layer EML-3, and a second electrode E2-3.

The first electrodes E1-1, E1-2 and E1-3 may be disposed on the fourth insulating layer IL4. The first electrodes E1-1, E1-2 and E1-3 may be electrically connected to the first to third transistors TR1, TR2 and TR3 through through-holes in one-to-one correspondence. In an exemplary embodiment, the first electrode E1-1 may be electrically connected to the first transistor TR1, for example. The first electrode E1-2 may be electrically connected to the second transistor TR2. The first electrode E1-3 may be electrically connected to the third transistor TR3.

The pixel defining layer PDL may expose at least a portion of each of the first electrodes E1-1, E1-2 and E1-3.

The first to third emission layers EML-1, EML-2 and EML-3 may be connected to each other to constitute a single unitary body. In an exemplary embodiment, the first to third emission layers EML-1, EML-2 and EML-3 may be disposed on the pixel defining layer PDL and the first electrodes E1-1, E1-2 and E1-3, for example. The first to third emission layers EML-1, EML-2 and EML-3 may generate blue light. The first to third emission layers EML-1, EML-2 and EML-3 may have a tandem structure or a single-layered structure.

The second electrodes E2-1, E2-2 and E2-3 may be connected to each other to constitute a single unitary body. The second electrodes E2-1, E2-2 and E2-3 may be disposed on the first to third emission layers EML-1, EML-2 and EML-3.

Even though not shown in the drawings, a hole control layer may be disposed between the first electrode and the emission layer, and an electron control layer may be disposed between the emission layer and the second electrode. The hole control layer may include at least one of a hole injection region, a hole transfer region, a buffer region, or an electron blocking region. The electron control layer may include at least one of an electron injection region, an electron transfer region, or a hole blocking region.

The thin film encapsulation layer TFE may be disposed on the second electrodes E2-1, E2-2 and E2-3. The thin film encapsulation layer TFE may directly cover the second electrodes E2-1, E2-2 and E2-3. In another exemplary embodiment, a capping layer covering the second electrodes E2-1, E2-2 and E2-3 may be disposed between the thin film encapsulation layer TFE and the second electrodes E2-1, E2-2 and E2-3. In this case, the thin film encapsulation layer TFE may directly cover the capping layer. In still another exemplary embodiment, the thin film encapsulation layer TFE may be omitted.

The thin film encapsulation layer TFE may include a first inorganic layer ECL1, an organic layer ECL2 and a second inorganic layer ECL3, which are sequentially stacked. The organic layer ECL2 may be disposed between the first inorganic layer ECL1 and the second inorganic layer ECL3. Each of the first and second inorganic layers ECL1 and ECL3 may be provided by depositing an inorganic material, and the organic layer ECL2 may be provided by a deposition, printing or coating process of an organic material.

The first and second inorganic layers ECL1 and ECL3 may protect the light emitting element layer EL from moisture and/or oxygen, and the organic layer ECL2 may protect the light emitting element layer EL from a foreign material such as dust particles. In an exemplary embodiment, each of the first and second inorganic layers ECL1 and ECL3 may include at least one of silicon nitride, silicon oxynitride, silicon oxide, titanium oxide, or aluminum oxide, for example. In an exemplary embodiment, the organic layer ECL2 may include a polymer, e.g., an acrylic-based organic layer. However, the invention is not limited thereto.

The thin film encapsulation layer TFE includes two inorganic layers and one organic layer in FIG. 4. However, the invention is not limited thereto. In another exemplary embodiment, the thin film encapsulation layer TFE may include three inorganic layers and two organic layers, and the inorganic layers and the organic layers may be alternately stacked. In still another exemplary embodiment, the thin film encapsulation layer TFE may be a single layer.

Figure 5:
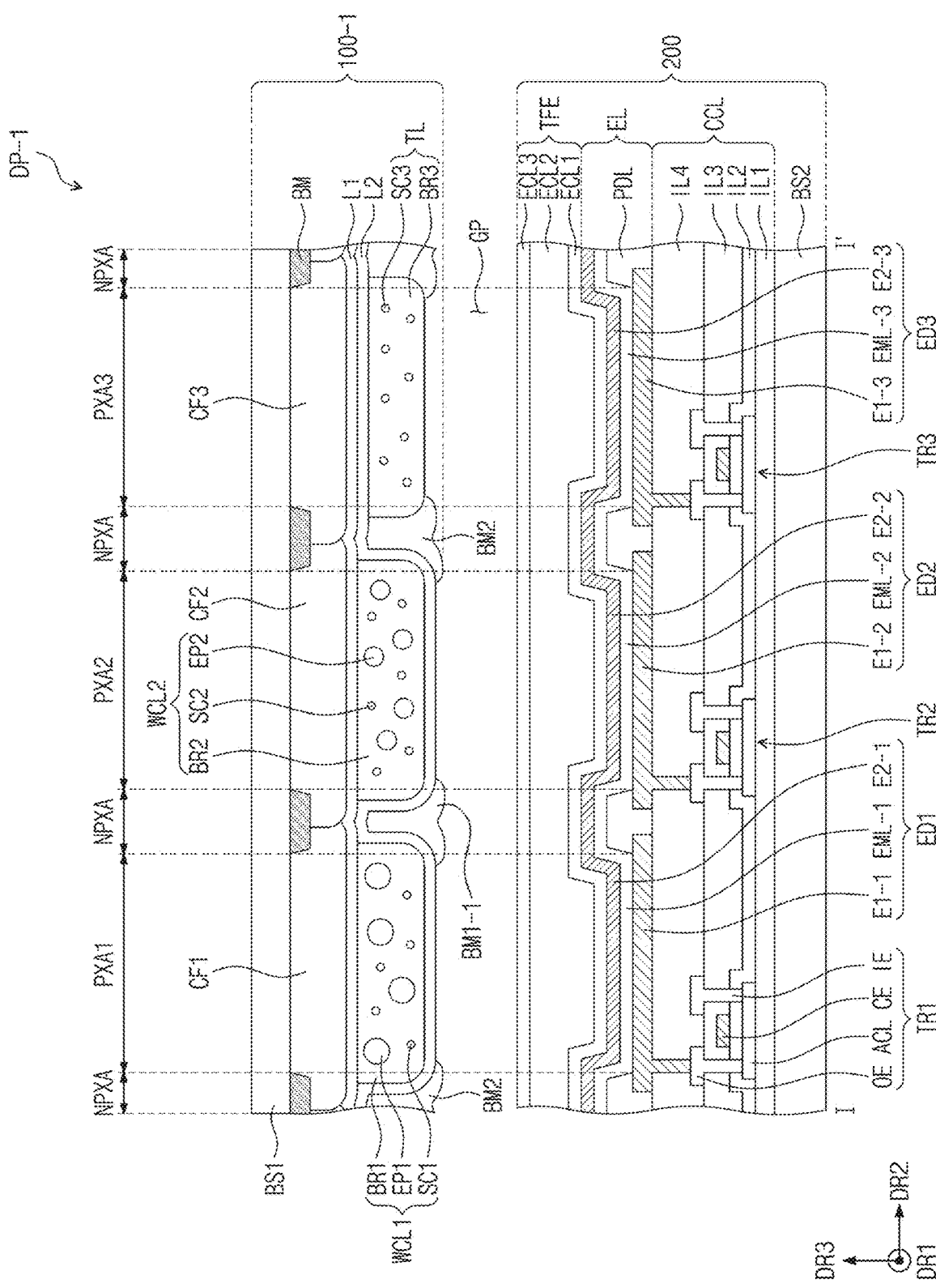
FIG. 5 is a cross-sectional view taken along line I-I' of FIG. 3 to illustrate an exemplary embodiment of a display panel according to the invention.

FIG. 5 is a cross-sectional view taken along line I-I' of FIG. 3 to illustrate an exemplary embodiment of a display panel according to the invention. In an exemplary embodiment of FIG. 5, the same components as described with reference to FIG. 4 will be indicated by the same reference designators, and the detailed descriptions thereto will be omitted.

Referring to FIG. 5, a display panel DP-1 may include a first substrate 100-1 including a first partition layer BM1-1 and a second partition layer BM2.

In an exemplary embodiment of the invention, light transmittances of the first and second partition layers BM1-1 and BM2 may not be 0 (zero). In addition, the first partition layer BM1-1 and the second partition layer BM2 may include a material capable of absorbing blue light. The first partition layer BM1-1 may include the same material as that of the second partition layer BM2. In an exemplary embodiment, the first and second partition layers BM1-1 and BM2 may include a red color filter, a green color filter, or a yellow color filter, for example.

In an exemplary embodiment of the invention, blue light traveling from one of the first and second wavelength conversion layers WCL1 and WCL2 and the optical layer TL to another thereof may be absorbed by the first partition layer BM1-1 or the second partition layer BM2. In addition, the first partition layer BM1-1 and the second partition layer BM2 may absorb blue light, traveling in a direction causing color mixing, of lights provided from the first to third emission layers EML-1, EML-2 and EML-3. Thus, a color mixing phenomenon between the first to third pixel areas PXA1, PXA2 and PXA3 may be reduced, and display quality of the display panel DP-1 may be improved.

Figure 6:
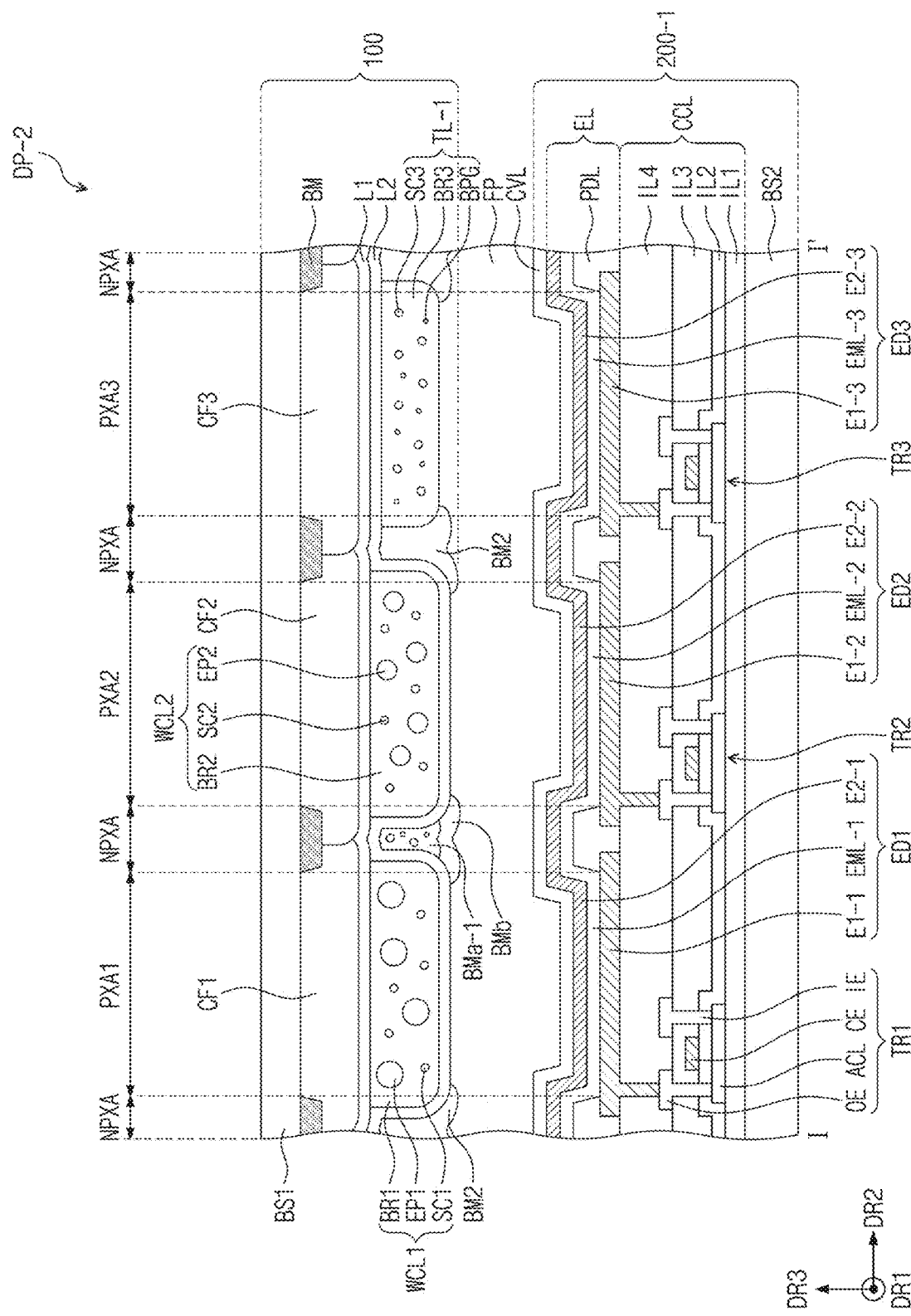
FIG. 6 is a cross-sectional view taken along line I-I' of FIG. 3 to illustrate an exemplary embodiment of a display panel according to the invention.

FIG. 6 is a cross-sectional view taken along line I-I' of FIG. 3 to illustrate an exemplary embodiment of a display panel according to the invention. In an exemplary embodiment of FIG. 6, the same components as described with reference to FIG. 4 will be indicated by the same reference designators, and the detailed descriptions thereto will be omitted.

Referring to FIG. 6, a display panel DP-2 may include a first substrate 100 and a second substrate 200-1.

The second substrate 200-1 may include a cover layer CVL instead of the thin film encapsulation layer TFE (refer to FIG. 4), as compared with the second substrate 200 of FIG. 4. The cover layer CVL may include an inorganic layer. The cover layer CVL may cover the second electrodes E2-1, E2-2 and E2-3 to prevent the second electrodes E2-1, E2-2 and E2-3 from being oxidized. In another exemplary embodiment, the cover layer CVL may be omitted.

An optical layer TL-1 may further include blue particles BPG. Thus, a first layer BMa-1 including the same material as that of the optical layer TL-1 may further include the same material as that of the blue particle BPG. Thus, red or green light traveling from one of the first and second wavelength conversion layers WCL1 and WCL2 to the other thereof may be absorbed by the blue particle BPG included in the first layer BMa-1. In an exemplary embodiment, the blue particle BPG may be a blue pigment or a blue dye, for example.

A filling layer FP may further be disposed between the first substrate 100 and the second substrate 200-1. The filling layer FP may include a filler. In an exemplary embodiment, the filling layer FP may include, but not limited to, a silicon-based polymer, an epoxy-based resin, or an acrylic-based resin, for example.

Figure 7:
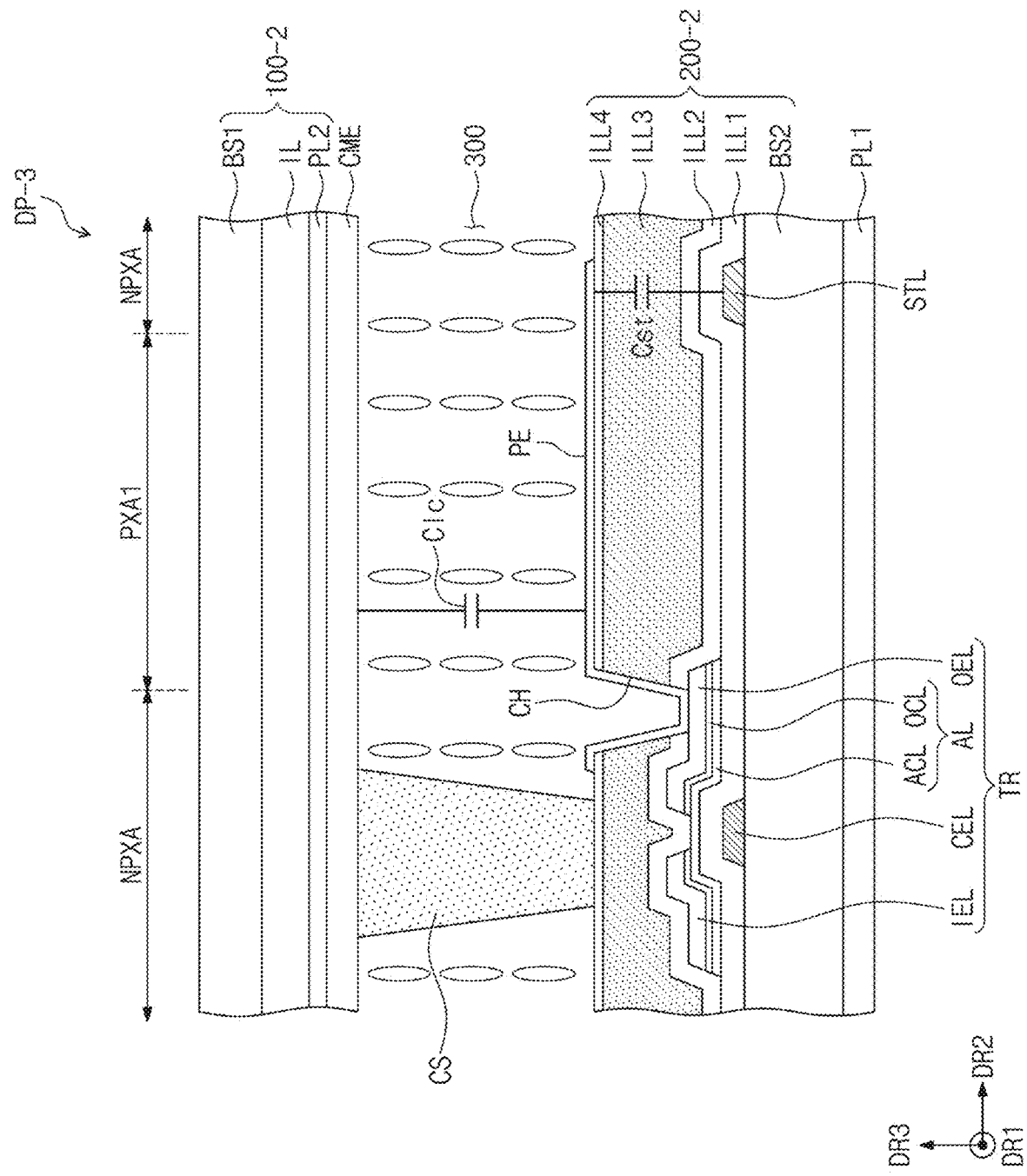
FIG. 7 is a cross-sectional view illustrating an exemplary embodiment of a display panel according to the invention.

FIG. 7 is a cross-sectional view illustrating an exemplary embodiment of a display panel according to the invention.

Referring to FIG. 7, a display panel DP-3 may be a liquid crystal display panel, for example. A pixel of the display panel DP-3 may include a transistor TR, a liquid crystal capacitor Clc, and a storage capacitor Cst in the viewpoint of an equivalent circuit. The transistor TR may include a control electrode CEL, an input electrode IEL, an output electrode OEL, and an active portion AL.

The display panel DP-3 may include a first substrate 100-2, a second substrate 200-2, and a liquid crystal layer 300. The liquid crystal layer 300 may be disposed between the first substrate 100-2 and the second substrate 200-2.

A spacer CS may be disposed between the first substrate 100-2 and the second substrate 200-2. The spacer CS may overlap with a light blocking area NPXA in a plan view.

The display panel DP-3 may include first and second polarizer layers PL1 and PL2. The first polarizer layer PL1 may be disposed under the second substrate 200-2. The second polarizer layer PL2 may be included in the first substrate 100-2. The second polarizer layer PL2 may include a wire grid.

A base layer BS2 of the second substrate 200-2 may be a plastic substrate, a glass substrate, an insulating film, or a stack structure including a plurality of insulating layers. The control electrode CEL and a storage line STL may be disposed on one surface of the base layer BS2. A first insulating layer ILL1 may be disposed on the one surface of the base layer BS2 and may cover the control electrode CEL and the storage line STL. The first insulating layer ILL1 may include at least one of an inorganic material or an organic material.

The active portion AL overlapping with the control electrode CEL may be disposed on the first insulating layer ILL1. The active portion AL may include a semiconductor layer ACL and an ohmic contact layer OCL. The semiconductor layer ACL may be disposed on the first insulating layer ILL1, and the ohmic contact layer OCL may be disposed on the semiconductor layer ACL.

The semiconductor layer ACL may include amorphous silicon or poly-silicon. In an alternative exemplary embodiment, the semiconductor layer ACL may include a metal oxide semiconductor. The ohmic contact layer OCL may be doped with dopants. A concentration of the dopants in the ohmic contact layer OCL may be higher than a concentration of dopants in the semiconductor layer ACL. The ohmic contact layer OCL may include two portions spaced apart from each other. In an exemplary embodiment of the invention, the ohmic contact layer OCL may have a shape of a single unitary body.

The input electrode IEL and the output electrode OEL may be disposed on the active portion AL. The input electrode IEL and the output electrode OEL may be spaced apart from each other. A second insulating layer ILL2 may be disposed on the first insulating layer ILL1 and may cover the active portion AL, the input electrode IEL, and the output electrode OEL. The second insulating layer ILL2 may be an inorganic layer.

A third insulating layer ILL3 may be disposed on the second insulating layer ILL2. The third insulating layer ILL3 may be an organic layer providing a flat surface. A fourth insulating layer ILL4 may be disposed on the third insulating layer ILL3. The fourth insulating layer ILL4 may be an inorganic layer.

A pixel electrode PE may be disposed on the fourth insulating layer ILL4. The pixel electrode PE may be connected to the output electrode OEL through a contact hole CH penetrating the second, third and fourth insulating layers ILL2, ILL3 and ILL4. An alignment layer (not shown) covering the pixel electrode PE may be disposed on the fourth insulating layer ILL4.

A base layer BS1 of the first substrate 100-2 may be a plastic substrate, a glass substrate, an insulating film, or a stack structure including a plurality of insulating layers. An intermediate layer IL, the second polarizer layer PL2 and a common electrode CME may be disposed on a bottom surface of the base layer BS1.

The liquid crystal layer 300 may operate by charging or discharging of the liquid crystal capacitor Clc, and source light provided from a backlight unit may be selectively provided to the intermediate layer IL through the first polarizer layer PL1, the liquid crystal layer 300, and the second polarizer layer PL2.

In the illustrated exemplary embodiment, the intermediate layer IL is simply illustrated. However, the intermediate layer IL may have one of the stack structures disposed on bottom surfaces of the base layers BS1 of FIGS. 4 to 6.

However, the cross section of FIG. 7 is illustrated as an example of the invention. The liquid crystal display panel of a vertical alignment ("VA") mode is illustrated as an example in FIG. 7. However, the invention is not limited thereto. In other exemplary embodiments, the display panel DP-3 may be a liquid crystal display panel of various modes such as an in-plane switching ("IPS") mode, a fringe-field switching ("FFS") mode, a plane-to-line switching ("PLS") mode, a super vertical alignment ("SVA") mode, or a surface-stabilized vertical alignment ("SS-VA") mode.

FIGS. 8A to 8D are cross-sectional views illustrating an exemplary embodiment of a method of manufacturing a wavelength conversion substrate, according to the invention.

Figure 8A:
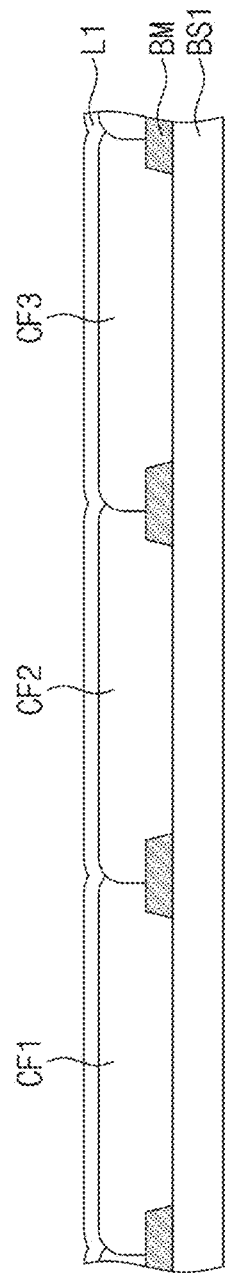
FIGS. 8A to 8D are cross-sectional views illustrating an exemplary embodiment of a method of manufacturing a wavelength conversion substrate, according to the invention.

Referring to FIG. 8A, a light blocking layer BM may be disposed on a base layer BS1. A first color filter layer CF1, a second color filter layer CF2 and a third color filter layer CF3 may be disposed on the light blocking layer BM. A first protective layer L1 may be provided to cover the first color filter layer CF1, the second color filter layer CF2, and the third color filter layer CF3.

Figure 8B:
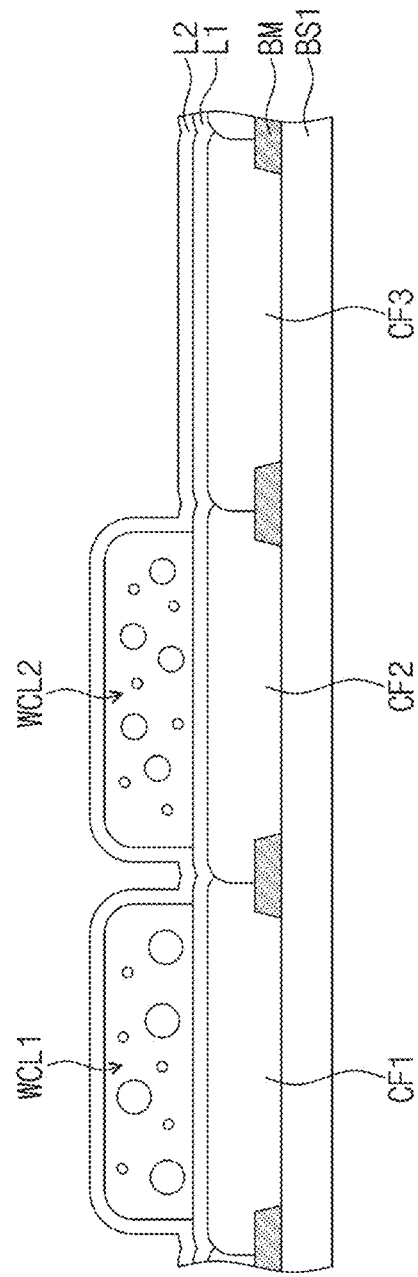

Referring to FIG. 8B, a first wavelength conversion layer WCL1 may be disposed on the first color filter layer CF1. A second wavelength conversion layer WCL2 may be disposed on the second color filter layer CF2. Thereafter, a second protective layer L2 may be provided to cover the first wavelength conversion layer WCL1 and the second wavelength conversion layer WCL2.

Figure 8C:
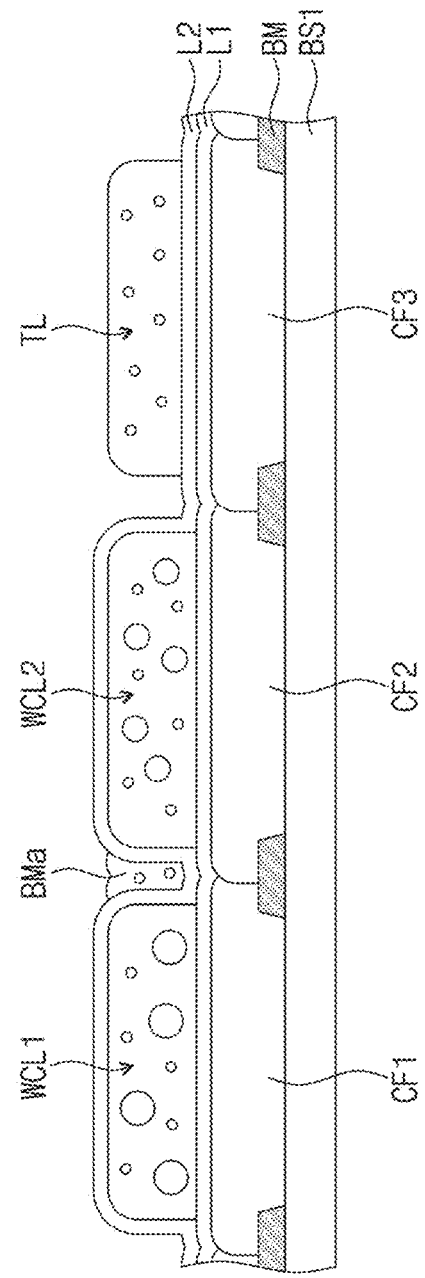

Referring to FIG. 8C, an optical layer TL may be disposed on the third color filter layer CF3. In addition, a first layer BMa may be disposed between the first wavelength conversion layer WCL1 and the second wavelength conversion layer WCL2. The first layer BMa and the optical layer TL may be provided at the same time by the same process.

In an exemplary embodiment of the invention, the optical layer TL may be provided after the formation of the second protective layer L2 protecting the first wavelength conversion layer WCL1 and the second wavelength conversion layer WCL2. Thus, the second protective layer L2 may be disposed between the optical layer TL and the third color filter layer CF3.

Figure 8D:
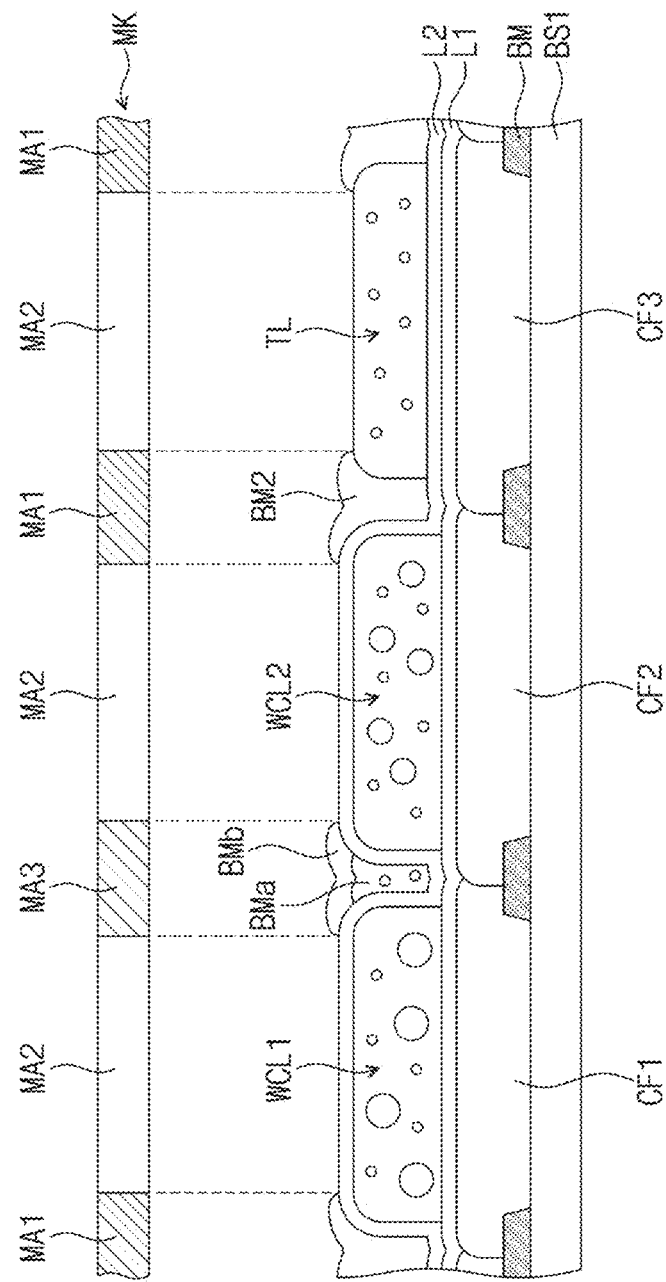

Referring to FIG. 8D, a second layer BMb may be disposed on the first layer BMa, and a second partition layer BM2 may be disposed between the second wavelength conversion layer WCL2 and the optical layer TL. The second layer BMb and the second partition layer BM2 may include the same material by the same process.

A patterning process may be performed to form the second layer BMb and the second partition layer BM2, and a mask MK may be used in the patterning process. A photoresist layer may be disposed on the second protective layer L2, the first layer BMa, and the optical layer TL by a coating process. Thereafter, the mask MK may be aligned over the photoresist layer. Subsequently, an exposure process and a development process may be performed on the photoresist layer to form the second layer BMb and the second partition layer BM2.

In an exemplary embodiment of the invention, the second layer BMb and the second partition layer BM2 may include a material capable of absorbing blue light and may have a light transmittance which is not 0 (zero). In other words, a light transmittance of the photoresist layer provided into the second layer BMb and the second partition layer BM2 may not be 0. In this case, even though the photoresist layer fully covers the base layer BS1, a key pattern (not shown) on the base layer BS1 may be visible. Thus, the mask MK may be easily aligned based on the key pattern.

The mask MK may include a first mask area MA1, a second mask area MA2, and a third mask area MA3. The first mask area MA1 may be aligned with an area corresponding to a position at which the second partition layer BM2 is disposed. The second mask area MA2 may be aligned with an area corresponding to a position of each of the first wavelength conversion layer WCL1, the second wavelength conversion layer WCL2 and the optical layer TL. The third mask area MA3 may be aligned with an area in which the second layer BMb is disposed. The first mask area MA1 may be a light blocking area, and the second mask area MA2 may be a transparent area. The third mask area MA3 may be a semitransparent area.

In the exemplary embodiments of the invention, light traveling from the emission layer in a direction causing color mixing may be absorbed by the first and second partition layers. Thus, the color mixing phenomenon between the pixel areas may be reduced, and the display quality of the display panel may be improved. In addition, the light transmittances of the first and second partition layers may not be 0. Thus, even though the photoresist layer fully covers the base layer in the process of forming the first and second partition layers, the key pattern on the base layer may be easily visible. As a result, the first and second partition layers may be easily provided.

While the invention has been described with reference to exemplary embodiments, it will be apparent to those skilled in the art that various changes and modifications may be made without departing from the spirits and scopes of the invention. Therefore, it should be understood that the above exemplary embodiments are not limiting, but illustrative. Thus, the scopes of the invention are to be determined by the broadest permissible interpretation of the following claims and their equivalents, and shall not be restricted or limited by the foregoing description.

What is claimed is:

1. A display panel comprising:
a first substrate in which a first pixel area, a second pixel area, a third pixel area and a light blocking area are defined, the first substrate comprising:
a base layer;
a first wavelength conversion layer disposed under the base layer and disposed in the first pixel area;
a second wavelength conversion layer disposed under the base layer and disposed in the second pixel area;
an optical layer disposed under the base layer and disposed in the third pixel area; and
a first partition layer disposed between the first and second wavelength conversion layers and comprising:
a first layer including a same material as a material of the optical layer; and a second layer spaced apart from the base layer with the first layer interposed therebetween; and
a second partition layer disposed between the second wavelength conversion layer and the optical layer; and
a second substrate comprising a first element, a second element and a third element which correspond to the first pixel area, the second pixel area and the third pixel area, respectively.

2. The display panel of claim 1, wherein the second layer includes a same material as a material of the second partition layer.

3. The display panel of claim 1, wherein a thickness of the second layer is less than a thickness of the second partition layer.

4. The display panel of claim 1, wherein the second layer and the second partition layer include a material which is capable of absorbing blue light and of which a light transmittance is not 0 (zero).

5. The display panel of claim 1, wherein the second layer and the second partition layer include a red color filter, a green color filter, or a yellow color filter.

6. The display panel of claim 1, wherein the first substrate further comprises:
a red color filter layer disposed between the first wavelength conversion layer and the base layer;
a green color filter layer disposed between the second wavelength conversion layer and the base layer; and
a blue color filter layer disposed between the optical layer and the base layer.

7. The display panel of claim 6, wherein the first substrate further comprises a first protective layer covering the red color filter layer, the green color filter layer, and the blue color filter layer; and the first protective layer is disposed between the red color filter layer and the first wavelength conversion layer, between the green color filter layer and the second wavelength conversion layer, and between the blue color filter layer and the optical layer.

8. The display panel of claim 7, wherein the first substrate further comprises a second protective layer covering the first and second wavelength conversion layers; and a portion of the second protective layer is disposed between the optical layer and the blue color filter layer.

9. The display panel of claim 1, wherein each of the first layer and the optical layer includes a base resin and scattering particles dispersed in the base resin.

10. The display panel of claim 9, wherein each of the first layer and the optical layer further includes blue particles dispersed in the base resin.

11. A display panel comprising:
a first substrate in which a first pixel area, a second pixel area, a third pixel area and a light blocking area are defined, the first substrate comprising:
a base layer;
a first wavelength conversion layer disposed under the base layer and disposed in the first pixel area;

a second wavelength conversion layer disposed under the base layer and disposed in the second pixel area;

a protective layer covering the first wavelength conversion layer and the second wavelength conversion layer;

an optical layer disposed under the protective layer and disposed in the third pixel area;

a first partition layer disposed between the first wavelength conversion layer and the second wavelength conversion layer; and a second partition layer disposed between the second wavelength conversion layer and the optical layer; and a second substrate comprising a first element, a second element and a third element which correspond to the first pixel area, the second pixel area and the third pixel area, respectively.

12. The display panel of claim 11, wherein each of the first and second partition layers is capable of absorbing blue light and has a light transmittance which is not 0.

13. The display panel of claim 11, wherein the first partition layer comprises:

a first layer disposed under the base layer; and a second layer disposed under the first layer.

14. The display panel of claim 13, wherein the first layer includes a same material as a material of the optical layer, and the second layer includes a same material as a material of the second partition layer.

15. The display panel of claim 13, wherein each of the first layer and the optical layer includes a base resin and scattering particles dispersed in the base resin.

16. The display panel of claim 15, wherein each of the first layer and the optical layer further includes blue particles dispersed in the base resin.

17. The display panel of claim 13, wherein a thickness of the second layer is less than a thickness of the second partition layer.

18. A method of manufacturing a wavelength conversion substrate, the method comprising:

forming a first color filter layer, a second color filter layer, and a third color filter layer on a base layer;

forming a first wavelength conversion layer overlapping with the first color filter layer;

forming a second wavelength conversion layer overlapping with the second color filter layer;

forming a protective layer covering the first wavelength conversion layer and the second wavelength conversion layer;

forming an optical layer overlapping with the third color filter layer on the protective layer;

forming a first layer including a same material as a material of the optical layer between the first wavelength conversion layer and the second wavelength conversion layer;

forming a second layer on the first layer; and forming a partition layer between the second wavelength conversion layer and the optical layer.

19. The method of claim 18, wherein the first layer and the optical layer are provided at a same time.

20. The method of claim 18, wherein the second layer and the partition layer are provided at a same time.

* * * * *